United States Patent [19]

Timpany et al.

[11] Patent Number: 5,354,471
[45] Date of Patent: Oct. 11, 1994

[54] METHOD OF TREATING WASTEWATER

[76] Inventors: Peter L. Timpany, 428 Oakridge Way SW., Calgary, Alberta, Canada, T2V 1T4; Chester Q. Yang, 55 - 4936 Dalton Drive NW., Calgary, Alberta, Canada, T3A 2E4

[21] Appl. No.: 963,478

[22] Filed: Oct. 19, 1992

[51] Int. Cl.$^5$ .............................................. C02F 9/00
[52] U.S. Cl. .................................. 210/607; 210/629; 210/142; 210/199; 210/201; 210/253
[58] Field of Search ............... 210/605, 607, 620–626, 210/630, 629, 141–143, 195.1, 199, 200, 201, 219, 220, 253–255

[56] References Cited

U.S. PATENT DOCUMENTS

| | | | |
|---|---|---|---|
| 4,948,510 | 8/1990 | Todd et al. | 210/622 |
| 5,102,548 | 4/1992 | Baxter | 210/621 |
| 5,192,442 | 3/1993 | Piccirillo et al. | 210/622 |
| 5,213,681 | 5/1993 | Kos | 210/621 |
| 5,228,996 | 7/1993 | Lansdell | 210/621 |

*Primary Examiner*—Thomas Wyse
*Attorney, Agent, or Firm*—George Dunsmuir

[57] ABSTRACT

Conventional biological processes for treating wastewater include the so-called activated sludge process which is continuous and the sequencing batch reaction (SBR) activated sludge process. The first process requires the use of dedicated, relatively expensive external clarifiers, and the second process is inefficient in terms of treatment volume. A modified sequencing batch reactor process and system enable the efficient, continuous treatment and discharge of wastewater, combing the advantages of the SBR and activated sludge processes. In the present case, wastewater is initially fed in a first direction through a plurality of contiguous cells, the wastewater is subjected at all times to biological treatment in a plurality of such cells and settled in at least one of the cells immediately prior to discharge from the system. In subsequent steps, the wastewater is fed into the system at different locations for following a variety of biological treatment steps and paths through the cells, whereby selected aerobic treatment cells become settling cells and vice versa, so that wastewater is introduced and discharged from the system in a fixed rotating pattern. The activated sludge generally flows in the same direction as the wastewater but receives settling and separation from the wastewater immediately prior to discharge of treated wastewater from the system.

19 Claims, 8 Drawing Sheets

STEP 1

STEP 2

STEP 3

STEP 4

STEP 1

STEP 2

STEP 3

STEP 4

STEP 1

STEP 2

STEP 3

STEP 4

METHOD OF TREATING WASTEWATER

BACKGROUND OF THE INVENTION

1. Field of the Invention

This invention relates to a method and a system for biological treatment of wastewater.

More specifically, the method and system of the present invention are designed for the biological removal of contamination in the form of solids and soluble organic material, and optionally the biological removal of nitrogen and phosphorus nutrients from wastewater.

2. Discussion of the Prior Art

The biological treatment of sewage and other apparatuses for effecting such treatment are described in U.S. Pat. Nos. 2,907,463, issued to D. J. N. Light et al on Oct. 6, 1959; 4,279,753, issued to N. E. Nielson et al on Jul. 21, 1981; 4,430,224, issued to U. Fuchs on Feb. 7, 1984; 4,431,543, issued to Y. Matsuo et al on Feb. 14, 1984; 4,522,722 issued to E. M. Nicholas on Jun. 11, 1985; 4,663,044, issued to M. C. Goronszy on May 5, 1987; 4,798,673, issued to C. Huntington on Jan. 17, 1989 and 4,948,510 issued to M. D. Todd et al on Aug. 14, 1990, and in Canadian Patents Nos. 997,488, issued to B. K. Tholander et al on Sep. 21, 1976 and 1,117,042, issued to M. L. Spector on Jan. 26, 1982.

In general, suspended growth activated sludge processes and modifications thereto have recently been shown to be able to accomplish the objectives set out above, but the costs of specialized clarifiers required to settle and recycle biological solids is quite high. Moreover, the size, complexity and operating problems encountered with such systems make them unattractive to potential users. In addition, the basic activated sludge process often suffers from poor treatment because of the continuous flow through characteristics in the final clarifier and the resulting constant sludge management requirements.

As a consequence of the foregoing, during the past ten years improved final clarification and solids removal has been sought by using larger and improved but more complex and expensive designs for final clarifiers. Moreover, final effluent filtration is often necessary to reliably meet permitted environmental standards.

There has also been a recent revival of interest in the sequencing batch reactor (SBR) suspended growth activated sludge process because of the inherently more efficient batch settling and higher treatment efficiency possible for batch organic contaminants removal with the SBR process compared to the conventional continuous flow activated sludge process. The SBR process uses the same vessel for batch aerated biological reaction and quiescent batch settling. Thus, the SBR process eliminates the major cost of dedicated final clarifiers necessary for the conventional activated sludge process as well as improving upon solids removal performance.

However, the SBR process has several disadvantages, the principle one being that the process does not operate with continuous flow, but requires intermittent operation for cycles of fill, react, settle, decant and idle. The result can be a much lower volume to use ratio than that achieved using the conventional activated sludge process.

Accordingly, the SBR process is generally not cost effective for flows greater than five to ten MGD. Other disadvantages of the SBR process are that significant head loss occurs from the influent to the final effluent, requiring additional energy and pumping costs, and effluent flow is intermittent which can result in the necessity of constructing flow equalization systems to prevent peak loadings and adverse impacts on receiving waters.

Finally, the basic process and design limitations of the SBR process make it difficult to achieve the same high efficiency biological nutrient removal possible using the continuous flow activated sludge process.

Attempts have been made to overcome the limitations of the SBR and conventional activated sludge processes, while retaining the benefits of both basic processes. As yet, however, none of these attempts have resulted in new processes which have proven to be useful or commercially cost-effective.

The Degremont S.A. U.S. Pat. No. 3,470,092 issued to J. J. P. Bernard on Sep. 30, 1969 illustrates a first attempt to develop a new suspended growth activated sludge process utilizing the concepts of both batch treatment and continuous flow. This two cell process was partially interconnected at the water surface. The alternate cell feed concept was not effective because it did not achieve a high treatment efficiency, had a low aerator utilization factor, and required long detention times to operate resulting in expensive systems. A subsequent Union Carbide U.S. Pat. No. 4,179,366 issued to J. R. Kaelin on Dec. 18, 1979 added a third bottom interconnected cell, but also suffered from low treatment efficiency and ineffective changeover of feeding untreated wastewater from the first cell to the third cell. Moreover, the cross connections between the cells were not effective in achieving a quick-change to a new feeding cycle or in preventing mixing of solids between the cells in a quiescent settling phase and the middle cell undergoing aeration. The processes disclosed by both patents also required significant level fluctuations in the treatment cells between operating cycles which made it difficult to control flows and operate fixed, level sensitive mechanical aeration systems. A later Linde AG German Patent No. 3,147,920 issued on Oct. 13, 1983 utilized the same three cell concept as U.S. Pat. No. 4,179,366, but in order to achieve constant level operations and quicker cycle changes, added large, mechanically operated, full width flap gates between cells. The gates were designed to shut for a period at the end of each outside cell feed cycle in order to hydraulically isolate the cell and permit rapid quiescent settling of suspended solids similar to the SBR batch settling process. The process operated such that during the settling process in the first cell, the untreated wastewater was fed to the middle cell until the opposite end cell was fed.

Although this three cell process achieved a more constant level, and overcame some of the limitations of the prior art, however, the process failed to be useful because it relied on expensive and unreliable mechanical gates to separate the treatment cells at various cycle times. Moreover, the process failed because treatment efficiency and effectiveness was too low to be commercially useful.

A subsequent VOR SA French Patent No. 2550522 issued on Feb. 15, 1985, describes an apparatus including three separate, identical basins. The process concept required the use of a large, low rate suspended growth activated sludge treatment system. Each cell had piping interconnections between each basin so they could operate sequentially in aeration, idle, and clarification modes. This process also required a large, expensive treatment system because three independent basins were required, only ⅓ of the total treatment volume was used for biological treatment at any time, and only ⅓ of the aeration equipment could be used at one time. As a result, this process also has not proven to be useful or cost effective compared to conventional suspended growth activated sludge processes.

In spite of the above described attempts to improve on the performance and effectiveness of conventional activated sludge and SBR activated sludge processes, all such attempts have either failed to achieve the desired benefits, or have new inherent disadvantages which result in little or no net benefits compared to conventional methods. As yet no new processes have been developed which provide a higher treatment efficiency and are commercially more cost effective than the SBR and conventional activated sludge processes.

GENERAL DESCRIPTION OF THE INVENTION

The principle object of the present invention is to provide a method and a system which possesses the benefits of the sequencing batch reactor (SBR) process while eliminating the disadvantages of the SBR process.

Another object of the invention is to eliminate the disadvantages of prior art attempts to improve on SBR and conventional activated sludge processes by achieving improved aeration utilization and effectiveness of the aeration system, maintaining a constant level or requiring only small hydraulic level changes, and also making possible a continuous flow in, through, and out of a reactor system at all times.

Another object of the invention is to provide a process that is capable of achieving a high treatment efficiency and a system which is simple to design, construct, operate and maintain, while being more cost effective than either conventional activated sludge or SBR systems for either small or large flows up to 100 MGD or greater.

Another object of the invention is to provide a low cost method and a treatment system facilitating biological nutrient removal for wastewaters requiring high removal efficiency of solids and soluble organic material as well as nitrogen and/or phosphorous.

Yet another object of the invention is the use of a single basin for treatment to eliminate the inefficient land use, costs, and complexity of treating wastewaters in a plurality of separate hydraulic structures as required for conventional and SBR suspended growth activated sludge processes to date.

In accordance with one aspect, the invention relates to a method of biologically treating wastewater by activated sludge comprising the steps of feeding the wastewater through a plurality of contiguous zones or cells; subjecting the wastewater to aeration and biological treatment in at least three cells in a pair of contiguous cells; settling the wastewater immediately prior to discharge from at least one of said plurality of contiguous cells while the aeration means is off; successively feeding the wastewater in a variety of paths through the cells, whereby selected aerated aerobic treatment cells function as settling cells and vice versa; and wastewater is introduced and discharged from the system in a fixed rotational pattern selected to achieve the specific treatment objectives of the system.

In accordance with a second aspect, the invention relates to a system for biological treatment of wastewater comprising at least 4 zones or cells in a basin wherein at least 4 cells are each contiguous with at least 2 cells, all cells are provided with aeration and/or mixing means, at least 2 cells are feed cells provided with inlet means for introducing untreated wastewater; biological treatment means is provided to the wastewater in at least three cells; at least 2 cells provided with said aeration means are also provided with outlet means for discharging treated wastewater out of the treatment system after the aeration means is shut off and the biological solids have settled; each cell is connected to at least one cell by a hydraulic connection means or flow controlled hydraulic connection means or Flow Control Weir means as disclosed in applicant's co-pending U.S. patent application Ser. No. 07/963,479, filed Oct. 19, 1992 and the entire treatment system may be operated automatically by providing a central flow control means to direct the flow in, through and out of the treatment basin and control the on and off schedule for said aeration or mixing means in said system.

BRIEF DESCRIPTION OF THE DRAWINGS

The invention will be described in greater detail, with reference to the accompanying drawings, which illustrate preferred embodiments of the system of the present invention, and wherein.

For the sake of simplicity, in the drawings, aerators which are operating or on are represented by a circle with an "X" therein, aerators which are shut off and thus are not operating for that step are represented by simple circles, and mixers which are operating represented by circles with diametrically opposed darkened segments therein.

In addition, again to improve understanding of the drawings, dotted lines separating cells indicate that controlled or unhindered flow may occur through a hydraulic connection means between cells for that step, but in subsequent steps solid lines in the same location indicate that flow is prevented either by means of said Flow Control Weir or by conventional but less suitable flow controlled hydraulic connection means such as mechanical devices and piping. Conversely, solid lines separating cells for each step indicate no flow between adjacent contiguous cells for that portion of the system unless otherwise indicated by a flow directional arrow, in which case a suitable hydraulic connection means would be used.

DESCRIPTION OF PREFERRED EMBODIMENTS

Figure 1:
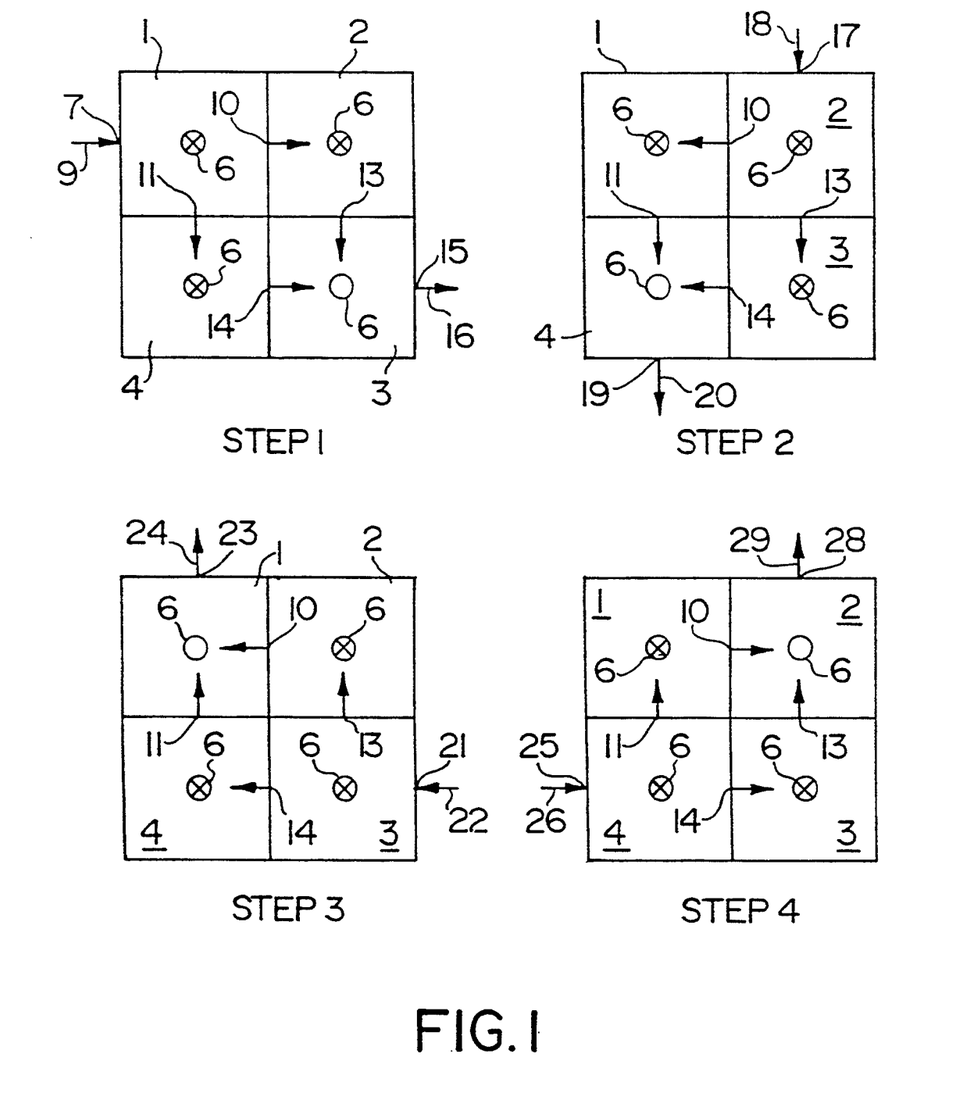
FIG. 1 is a schematic flow diagram of a four cell system for providing biological treatment of wastewater solids and soluble organic material in accordance with the present invention.

Referring to FIG. 1, the basic system of the present invention includes four treatment zones or cells 1, 2, 3 and 4 arranged in a square, i.e. the contiguous cells 1 to 4 each form one-quarter of a square. Each cell 1 to 4 contains an aerator 6. In the first step of operation, influent wastewater is introduced into the first feed cell 1 at inlet 7 via an inlet pipe 9. One-half of the wastewater from cell 1 flows through hydraulic connection means into each of cells 2 and 4 at points 10 and 11, respectively. The effluent from both cells 2 and 4 flows into cell 3 through hydraulic connection means at points 13 and 14, respectively. Effluent is discharged from cell 3 at outlet point 15 via pipe 16. During the first phase of operation, the aerators 6 in the three cells 1, 2 and 4 are operating to provide biological treatment, while the aerator in cell 3 is shut off, thus permitting quiescent settling of the activated sludge biological solids or mixed liquor suspended solids flowing from cells 2 and 4 to cell 3 upon entering the latter.

In the second step of operation, the wastewater influent flows into cell 2 at 17 through line 18. Wastewater flows from cell 2 to cells 1 and 3, and from cells 1 and 3 to cell 4. The aerators 6 of the three cells 1 to 3 are in operation, while the aerator 6 in cell 4 is shut off. Effluent is discharged from cell 4 at point 19 through pipe 20. During the second step of the operation, cell 4 is used to settle biological solids.

In the third step of operation, the wastewater enters cell 3 at point 21 through pipe 22. The three cells 2, 3 and 4 are used as treatment cells, one-half of the flow from cell 3 entering each of cells 2 and 4. The cell 1 becomes the settling cell and effluent is discharged at point 23 through pipe 24.

In the final step of operation, influent enters cell 4 at point 25 through pipe 26 and effluent leaves cell 2 at point 28 through pipe 29. The aerators 6 of the three cells 1, 3 and 4 are in operation, while the aerator 6 of cell 2 is shut off. Thus, the cells 1, 3 and 4 are treatment cells, while cell 2 operates as the settling cell.

Typically, during the first step of operation, biological solids in cell 4 are permitted to pre-settle for thirty to forty minutes before starting treated effluent discharge at the end of the first step. The duration of the pre-settling would be the same for each discharge cell for each step and is dependent upon the settling characteristics of the treated wastewater. However, normal settling rates of biological sludge would permit excellent batch solids clarification in this time period.

Upon completion of the first four steps described above, the treatment system repeats the operation described for the first step. The total operational cycle time to complete the four steps is typically eight to twenty-four hours depending upon the type of wastewater and the treatment/solids management objective. It will be appreciated that both the inlets and outlets can also rotate in the opposite (counter-clockwise) direction for each of the above four steps to accomplish the same treatment in cell sequence 1, 4, 3, and 2. For both rotation directions each cell is subject to the same four treatment steps in the sequence of feed, second position, third position, settle before returning once again to the same pattern of feed and subsequent steps for each cycle.

The types of wastewater inlet, hydraulic connection means, flow control valves and outlet means required for all embodiments of the invention are conventional valves, aerators, mixers, mechanically operated weirs, and fixed or floating discharge systems available from commercial suppliers or preferably the said Flow Control Weir. The free interconnections between the cells 1 to 4 are open for approximately 40% or more of the width of the cells at mid depth or near the bottom of the cell dividers. This is achieved using ports and conventional baffling materials or non-sealed earthen dikes with flow directional baffles for diverting the influent flow to the desired depth in each cell in order to permit the most effective inlet settling clarification mode.

It can be appreciated that a central flow control and aerator on/off operating schedule control means can be used to direct and accomplish all the operations described for FIG. 1 and all other embodiments of the invention.

Figure 2:
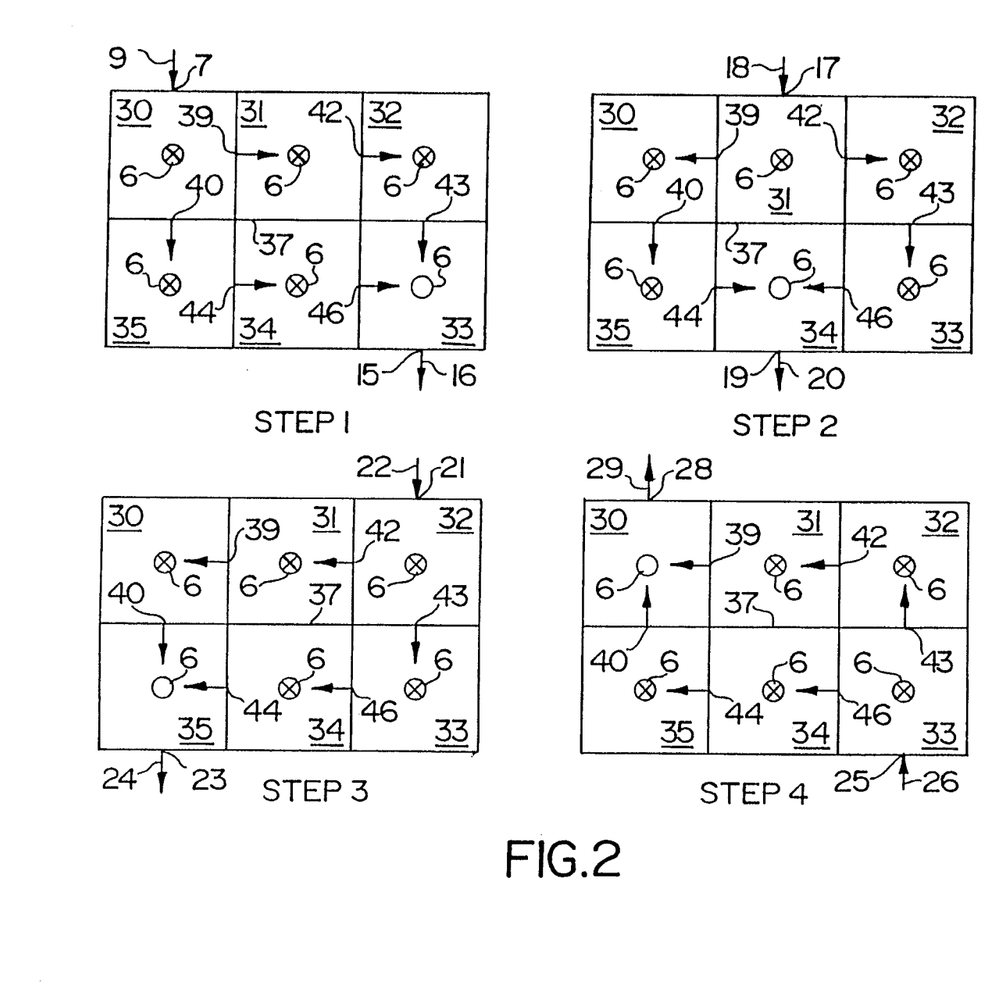
FIG. 2 is a schematic flow diagram of a six cell system in accordance with the present invention.

The system illustrated in FIG. 2 is essentially the same as the system of FIG. 1, except that six outside contiguous cells 30 to 35 are used. An imperforate barrier 37 is provided between the central opposite outside cells 31 and 34.

During the first step of operation, influent wastewater enters cell 30. Half of the wastewater from cell 30 flows into each of cells 31 and 35 at points 39 and 40, respectively. From cell 31, wastewater flows into cell 32 at point 42, and from cell 32 at point 43 to cell 33. The wastewater flowing into cell 35 flows into cell 34 at point 44 and from cell 34 into cell 33 at point 46. In each of the cells 30, 31, 32, 35 and 34, respectively the wastewater is aerobically treated. In cell 33, the aerator is off and such cell is used for settling solids. Effluent is discharged from cell 33 at point 15 through pipe 16.

In the second step of operation, influent enters cell 31 at point 17 through pipe 18 and is cycled through cells 30 and 35 in one direction and cells 32 and 33 in the other direction to cell 34, where effluent is discharged at point 19 through pipe 20. In the second step, each of the cells 30 to 33 and 35 are treatment cells, and cell 34 is a settling or clarifier cell.

In the third step of operation, influent enters cell 32 at point 21 through pipe 22. Wastewater passes from cell 32 in one direction through cells 31 and 30, respectively and in the other direction through cells 33 and 34 to the new settling cell 35. Effluent is discharged from cell 35 at point 23 through pipe 24.

In the fourth step of operation, influent enters cell 33 at point 25 through pipe 36. The wastewater is distributed in one direction through cells 32 and 31, and in the other direction through cells 34 and 35 to the final settling cell 30. The effluent is discharged from cell 30 at point 28 through pipe 29. Two more steps are used during similar feeding of effluent to cells 34, and 35 before returning to feed cell 30 once more. Each cell as a consequence is subject to the same 6 treatment steps sequence of feed, second position, third position, settle, third position, second position before returning again to the feed position for the same pattern in the next cycle.

It is apparent that six or more cell embodiments of the invention can utilize the same principles as a four cell system. The additional treatment cells can be used to provide improved treatment for difficult-to-treat wastewaters, or make possible special treatment steps such as those required for nutrient removal.

Figure 3:
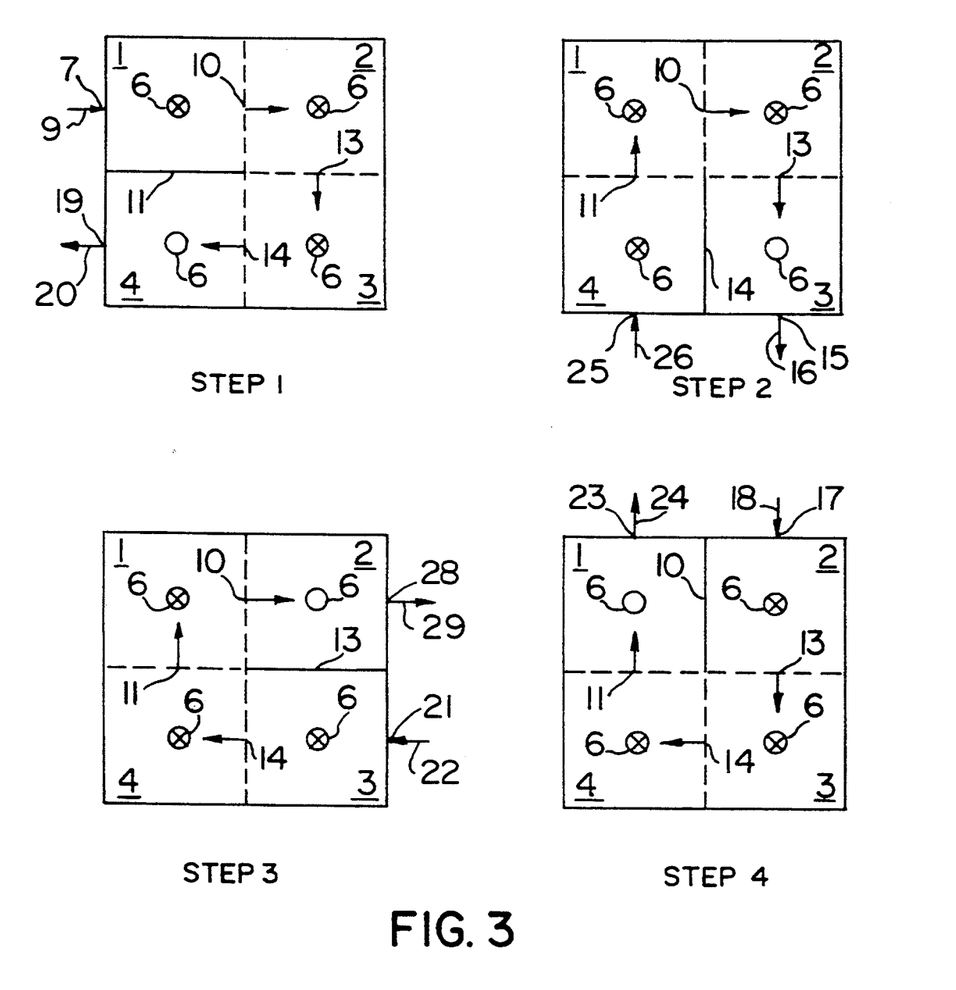
FIGS. 3 to 6 are schematic flow diagrams of four cell systems similar to the system of FIG. 1 in accordance with the present invention.

The system of FIG. 3 is similar to that of FIG. 1, however the use of the system is different. In the first step of operation, wastewater is introduced into the first feed cell 1 at inlet point 7 through pipe 9, passes into cell 2 through a flow controlled hydraulic connection means in the direction shown at point 10, but is prevented from passing into cell 4 by a flow controlled hydraulic connection means such as said Flow Control Weir located between cell 1 and cell 4. Wastewater continues its treatment path and passes from cell 2 in the direction shown at point 13 into cell 3. The thus biologically treated wastewater passes into cell 4 at point 14 for settling, while the aerator 6 in the last cell 4 is off as for all embodiments before the wastewater is discharged at outlet point 19 through 20. Thus the selected wastewater path results in a high degree of treatment as the wastewater is cycled through all four cells. The Flow Control Weir between cell 3 and 4 can be used as for all applications for Flow Control Weir to select the desired length of cross connection between the cells and ensure the even distribution of flow to make possible high efficiency solids settling in cell 4 prior to discharge at point 19. Similarly a Flow Control Weir can be located along the outside wall of cell 4 at point 19 to discharge treated wastewater while ensuring even collection of flow across the entire width of cell 4 to further improve biological solids settling efficiency prior to discharge at 19 through pipe 20.

The second step operates in the same pattern, the aerator 6 in cell 4 is turned on and the aerator 6 in cell 3 is turned off. Wastewater is introduced into cell 4 at inlet point 25 through pipe 26, and circulates through cells 1, 2 and 3, respectively. Sludge is permitted to settle in cell 3, and wastewater is discharged from cell 3 at outlet point 15 through pipe 16.

In the third step of operation, the second cell 2 becomes the settling cell, and influent is introduced into cell 3 at inlet point 21 through pipe 22. The wastewater circulates through cells 4 and 1 to cell 2. Effluent is discharged from cell 2 at outlet point 28 through pipe 29.

In the fourth and final step of operation, cell 1 becomes the settling cell. Influent enters cell 2 at inlet point 17 through pipe 18, circulates through cells 3, 4 and 1, respectively and is discharged from cell 1 at outlet point 23 through pipe 24.

The selected circulation path of wastewater sequentially through all four cells of this embodiment permits more plug flow capability than that of FIG. 1. When using the system of FIG. 3, all of wastewater flowing from one cell goes to a second cell, then to a third cell, and finally into a settling cell for final clarification. For this FIG. 3 embodiment, each cell is thus subject to an identical sequence pattern of feed, second position, third position, settle before returning again to the feed step once again. During each feed step in each cell, it is also possible to accomplish partial nitrogen nutrient removal by use of discrete mixing means to provide anaerobic and/or anoxic biological treatment prior to use of aeration means.

It may be appreciated by one familiar with wastewater treatment technology that rotating the inlets and outlets of FIG. 3 in a clockwise direction for each step, would not be a preferred embodiment because of the much lower treatment efficiency that would be obtained compared with that of the counter-clockwise fixed rotation of FIG. 3. It can also be appreciated that a similar 6 cell embodiment of this FIG. 3 would be equally or even more effective for certain wastewaters and treatment requirements.

Figure 4:
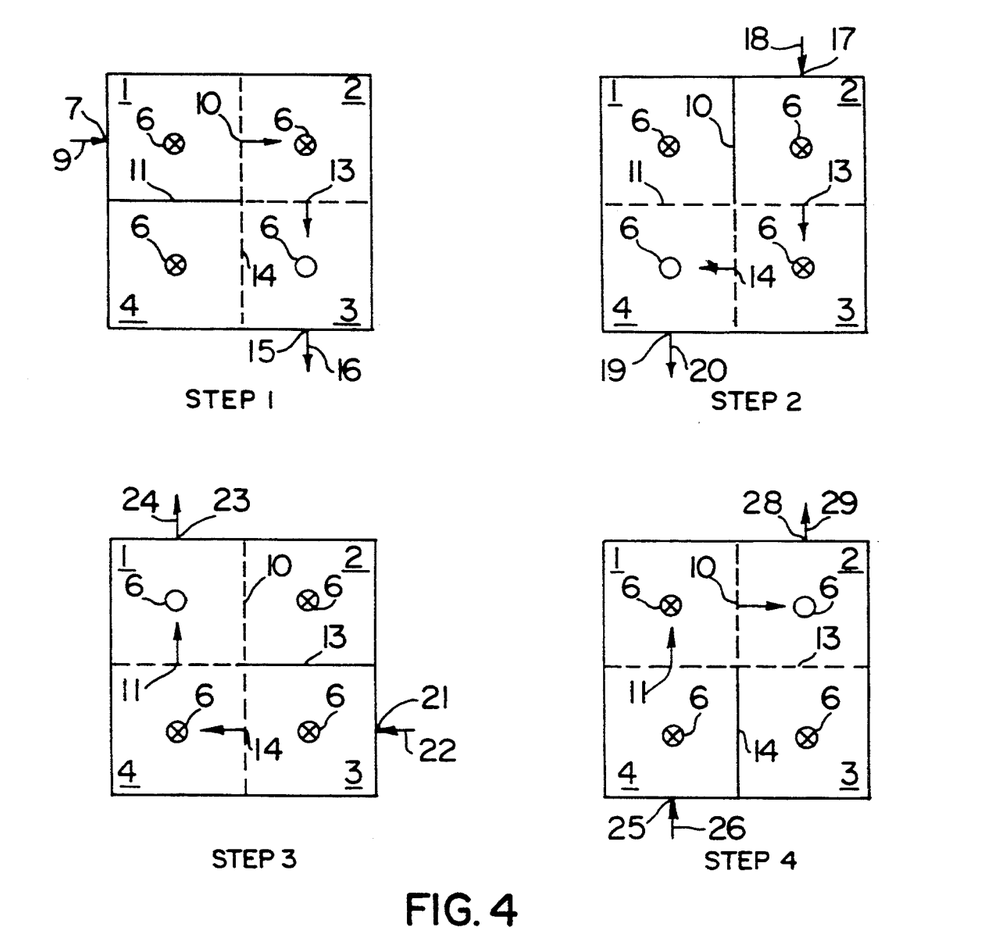

With reference to FIG. 4, a preferred method of using the system of FIG. 1 with a fixed clockwise rotation of inlets and outlets is to totally isolate the inlet wastewater cell for batch biological treatment during the next step after inlet feeding. In the first step, wastewater entering cell 1 at inlet point 7 through pipe 9 flows through treatment cells 1 and 2 and into settling cell 3 before discharge at outlet 15.

In the second step, cell 1 is isolated while continuing batch wastewater treatment, and influent enters cell 2 at inlet point 17 through pipe 18. The wastewater flows from cell 2 through cell 3 into the settling cell 4. The wastewater is discharged from cell 4 at outlet point 19 through pipe 20.

In the third step, cell 2 is isolated, and wastewater respectively. Sludge is permitted to settle in cell 3, and flows through cells 3, 4 and 1 respectively for discharge from cell 1 at outlet point 23 through pipe 24.

In the fourth step of operation, cell 3 is isolated, and wastewater flows through cells 4, 1 and 2, in that order. FIG. 4 embodiment thus results in a sequence pattern for each cell of feed, batch react, settle, second position prior to returning once again to the feed position in the next cycle of operation.

Figure 5:
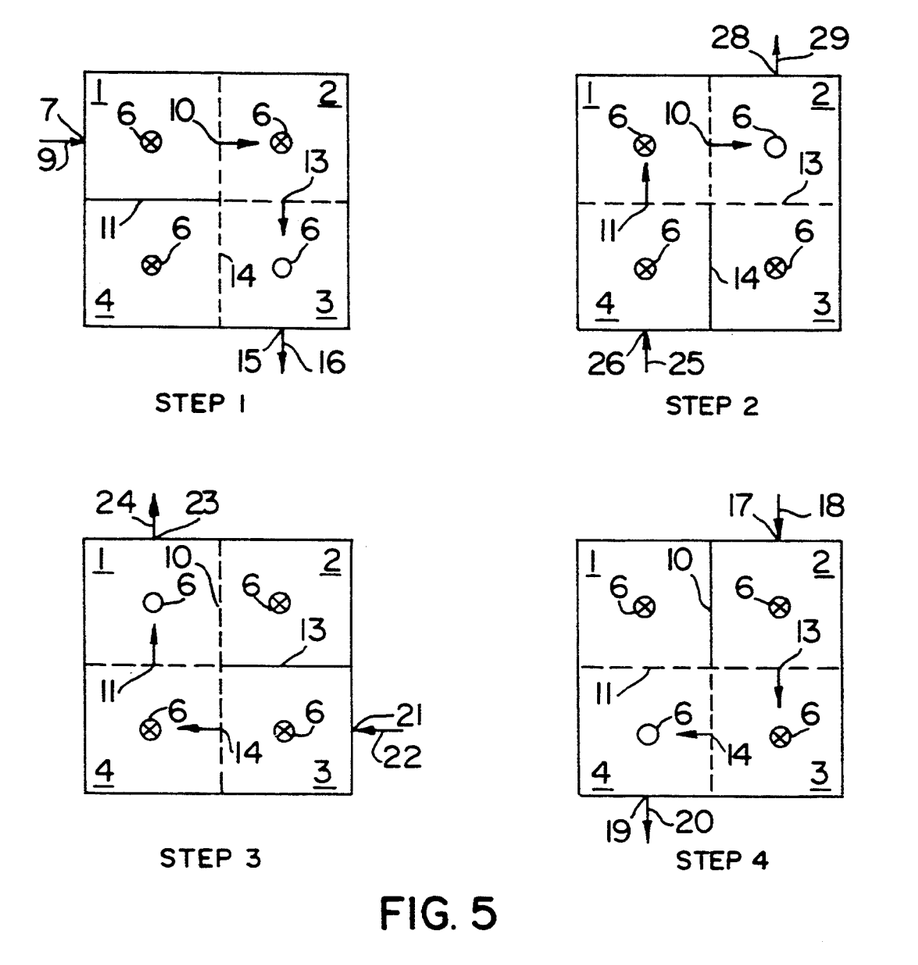

The treatment cycle of FIG. 5 is similar to that of FIG. 4, except that the order of isolation of the cells is changed and the inlets and outlets rotate in a fixed counter-clockwise direction for each step similar to FIG. 3. Cell 4 is isolated first, followed by cell 3, cell 2 and cell 1, respectively. During each step of operation, wastewater flows through two treatment cells to a settling cell, while the fourth cell remains isolated. Biological treatment is continued in the isolated cell. The purpose of isolating the cells in this manner after being operating as a clarifier is to permit a refresh cycle for the biological solids before each cell is fed untreated wastewater once again for each complete cycle of operation. This mode of operation is beneficial for particular wastewaters and treatment objectives. FIG. 5 embodiment thus achieves the sequence pattern for each cell of feed, second position, settle, and refresh before returning to the feed position in the next cycle.

For FIGS. 1 to 5, the wastewater pathway flowing through the treatment system is either in a clockwise or counter-clockwise direction, or in both directions at the same time.

Figure 6:
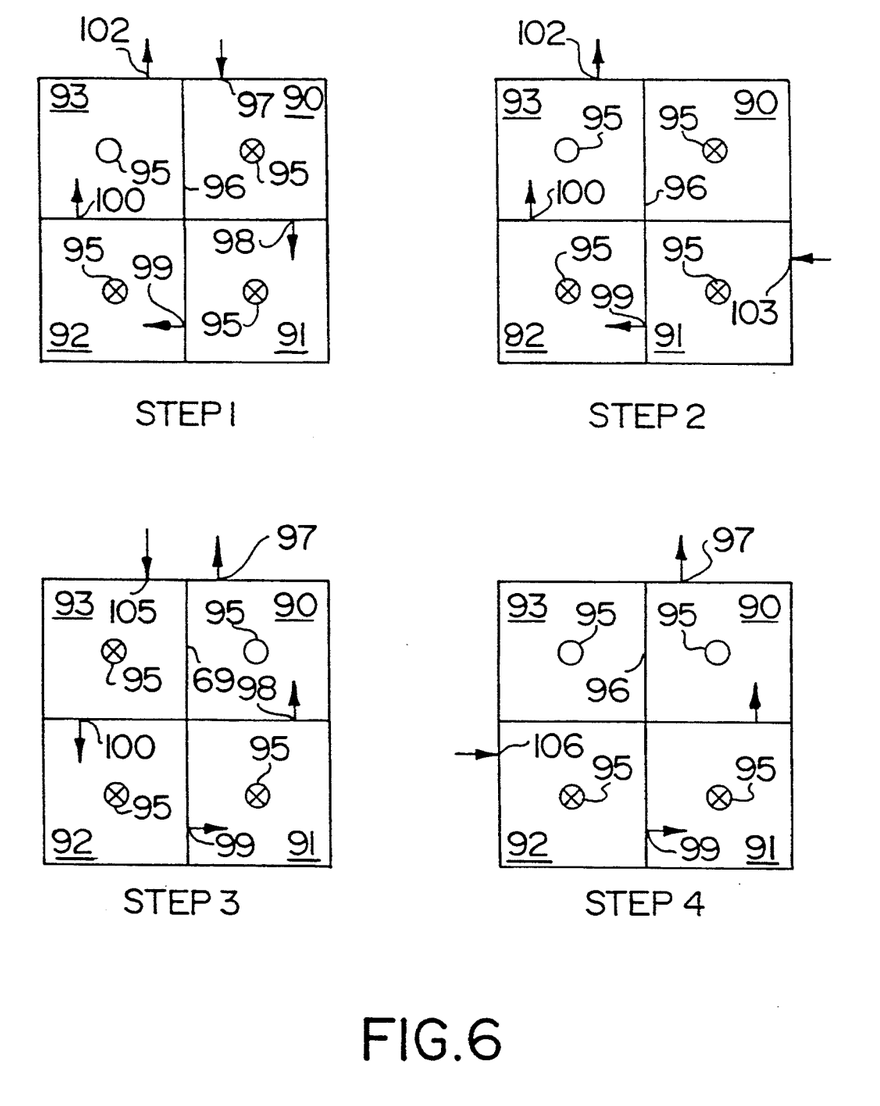

The 4 cell embodiment of FIG. 6 is similar to those in FIGS. 1, 3, 4 and 5 except the two adjacent cells 90 and 93 are not provided with a hydraulic connection means on the partition means separating said adjacent cells, and so the wastewater pathway flows for the first and second steps in the counter-clockwise direction, and then the wastewater flows in the clockwise direction for the third and fourth steps. The inlet rotation for FIG. 6 embodiment rotates in the fixed clockwise pathway direction except for reversed third and fourth inlet steps. This FIG. 6 embodiment of the invention provides additional plug flow capabilities than for the systems of FIGS. 4 and 5 and so can provide treatment for wastewaters which are more difficult to degrade. In addition, the system of FIG. 6 makes it possible to provide initial anaerobic or anoxic treatment steps before aerobic treatment while the first cell receives untreated wastewater immediately after that cell has functioned as a clarifier. This function is similar to that available for the FIG. 3 system. Hence to improve treatment by providing anaerobic and/or anoxic pre-treatment steps, mixers as well as aerators can be located in adjacent cells 90 and 93 in the manner described above.

In the third step of operation, instead of the flow entering cell 92 as it would for the FIG. 1 fixed rotating pattern system, the flow first enters cell 93 and then cell 92 in the fourth step to provide a fixed rotating pattern variation for the flow through characteristics which minimizes the number of discharge points (to two) and reduces the requirement for said Flow Control Weir or similar flow control means between cells. The treatment steps pattern for said adjacent cells 90 and 93 are feed, batch react, settle, and settle before returning once again to the same pattern of subsequent steps feed. The treatment steps pattern for the two intermediate cells 91 and 92 are second position, feed, third position, second position for each cycle of operation.

It will be appreciated that all cells or zones in FIGS. 1 to 6 may be provided with both mixers and aerators. The use of mixers alone during the feeding phase of any particular cell may be used to provide anaerobic or anoxic conditions in that cell. This anaerobic or anoxic period prior to aerobic treatment with aerators on for that cell may be used to reduce nutrients and certain difficult to degrade toxic components in the wastewater, as well as help control filamentous organism which can reduce biological treatment systems effectiveness.

By locating one of said Flow Control Weirs (not shown) between each contiguous cell on said partition means or common walls, and on the cell walls to be used to discharge treated wastewater, it can be seen that it is possible to flexibly operate in any and all desired schedule and flow patterns through the four cell treatment systems as envisaged in FIGS. 1, 3, 4, 5 and 6. These 4 cell embodiments also can be expanded to accommodate 5 or more cells if required. Said Flow Control Weir also makes it possible to evenly distribute or collect wastewater across any desired width of each cell and simultaneously control flow and prevent back or forward mixing between aeration and settling cells, and so improve treatment and clarification efficiency.

Figure 7:
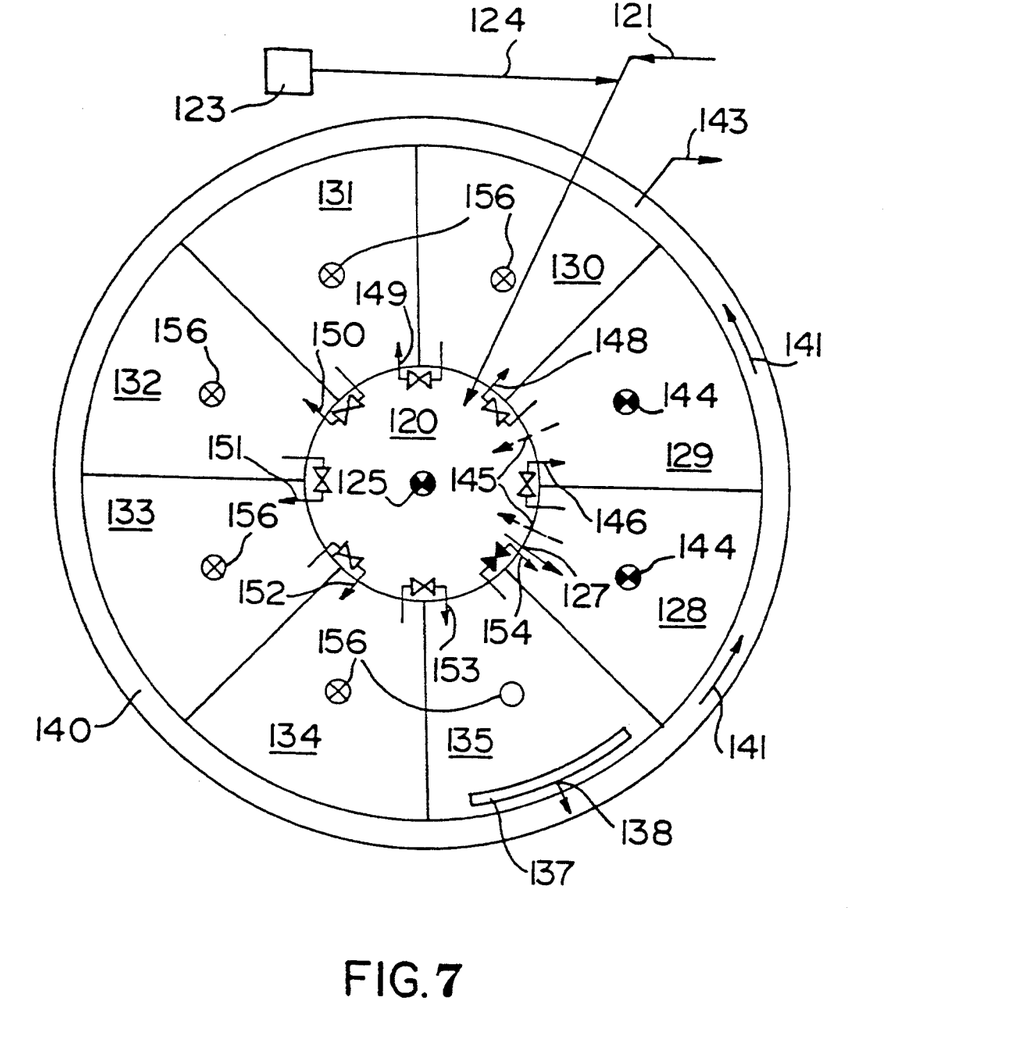
FIG. 7 is a schematic flow diagram of a circular system suitable for also providing biological nutrient removal in accordance with the present invention.

FIG. 7 illustrates a high efficiency biological nutrient removal embodiment of the invention. The system of FIG. 7 utilizes the same basic system concepts as described with respect to FIG. 3. Wastewater flows into a central anaerobic pre-treatment cell 120 via an inlet line 121. Additional concentric anaerobic and/or anoxic cells can be added conveniently if desired to further improve the system efficiency. Reactants such as volatile fatty acids are known to improve nutrient removal for some wastewater characteristics and operating conditions, and can be introduced into the inlet 121 from a reactant inlet 123 via pipe 124.

For the embodiment of FIG. 7, the anaerobic cell 120 contains a mixer 125 and has a dissolved oxygen concentration not greater than 0.1 mg/L. The wastewater treated anaerobically in the cell 120 is discharged at 127 into a first anoxic cell 128 and then into a second anoxic cell 129, both of which are a part of a series of contiguous cells defining an annulus around the cell 120. The dissolved oxygen in the anoxic cells is maintained at not greater than 0.5 mg/L by use of only mixers 144 while the aerators 156 (not shown in cells 128 and 129) are shut off. The annulus includes a plurality of outside cells 128 through 135. The wastewater flowing into cell 128 progresses through subsequent cells 129 to 135 before discharge of final treated wastewater through outlet weir 137 and control valve at 138.

In the first step of operation, the cells 128 and 129 are anoxic cells to provide denitrification by use of mixers 144 while aerators 156 (not shown) are off which are followed by aerobic cells 130 to 135 to provide biological treatment and nitrification, followed by a final settling cell 135. Wastewater discharged from cell 135 through the valve at 138 enters an annular cell 140. In cell 140, the effluent flows in the direction of arrows 141 for discharge through an outlet pipe 143. During the first step, recycle means from the second anoxic cell 129 causes denitrified wastewater to flow back into the anaerobic cell 120 at 145 with a recycle flow rate of 0.5 to 1.5 times the influent wastewater flow rate through pipe 121. Additional recycle means 145 as shown for cell 129 are available for each cell 130–135 (not shown) to facilitate similar recycle for each step from the second anoxic cell back to the anaerobic cell. In addition, if greater equivalent recycle of nitrified wastewater is desired than provided by the clarifier cell becoming the anoxic cell, then a first anoxic cell may be used as the outside center concentric cell (not shown) in combination with use of recycle 145 (not shown) for the last aerated cell (156 in FIG. 7).

Communication between the adjacent or contiguous outside cells occurs by use of flow controlled hydraulic connection means at 146, 148, 149, 150, 151, 152, and 153. The flow control valve at 154 between cells 128 and 135 is closed for step one. Alternately one of said Flow Control Weir can be used between each said contiguous cell to accomplish the same communication and controls. Also during such first step, the aerators in cells 156 in each of the cells 130 to 134 are in operation, and the cell 135 with aerator 156 shut off is used for settling of biological solids before discharge of treated effluent at 138.

At the end of the first step of operation, all outside cells, valves and recycle functions are rotated by one cell in a fixed clockwise direction, so that the first anoxic cell is cell 135, the second anoxic cell is cell 128, and the first aerobic cell is cell 129. The fixed rotation continues in subsequent steps along with similar recycle 145 back to anaerobic cell 120 from each second anoxic cell. All of the solids accumulated in each cell when it is operating as a clarifier cell are completely and automatically translated to become incorporated as the next first anoxic cell. The remaining cells continue to operate in the same manner, except for a rotation by one position. Because there are eight cells for this embodiment there would be eight distinct steps involving rotation between each such step until the first step is repeated at the start of a new operational cycle. It is also clear that the identical operations can be achieved with a counterclockwise rotation as for the above clockwise rotation provided the control valve at 154 in FIG. 7 is open for the first step and the control valve at 146 is closed.

Figure 8:
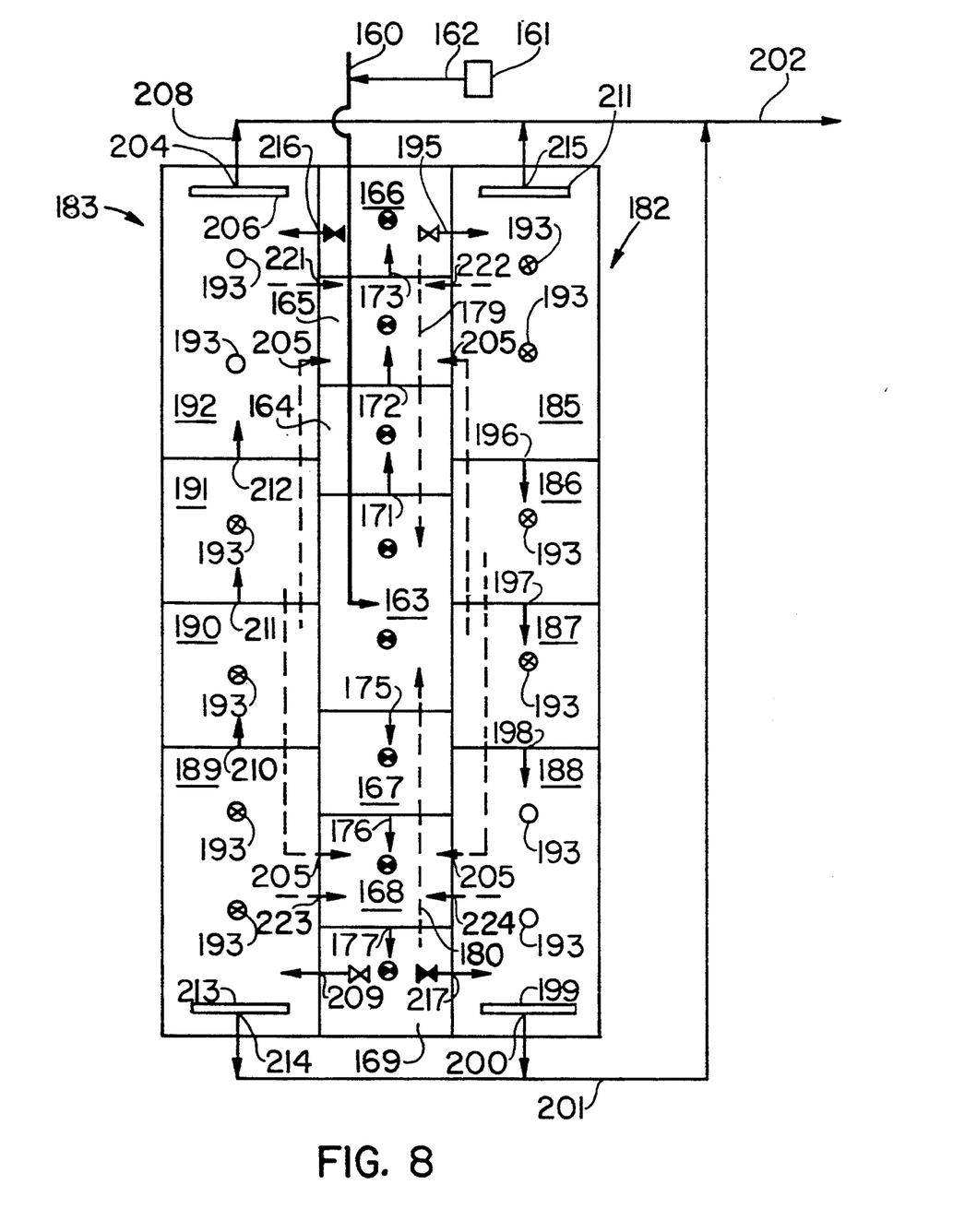
FIG. 8 is a schematic flow diagram of a multi-cell system also suitable for biological nutrient removal, but is a rectangular system in accordance with the present invention.

Referring to FIG. 8, a second nutrient removal embodiment similar to FIG. 7 utilizes a pair of two parallel rows of contiguous treatment cells like FIG. 2 but said cells are located on the outside of a row of parallel contiguous cells consisting of at least one anaerobic cell and at least two anoxic cells. The system of FIG. 8 includes an inlet pipe 160, reactant inlet 161 and pipe 162 communicating with the pipe 160 for introducing untreated wastewater and if required, supplimental reactants into at least one dedicated anaerobic cell 163 located at the center of the system. Additional anaerobic cells as illustrated by cells 164 and 167 can be added before the anoxic cells 165, 166, 168 and 169. In addition one extra aerobic cell (not shown) can be added to both the top and bottom of the system in FIG. 8 to receive the discharge from the last anoxic cells 166 and 169 respectively and so provide aerobic pre-treatment prior to wastewater flowing to the adjacent aerobic feed cells 192, 185 and 188, 189 respectively to complete the treatment process.

Cell 163 is bordered on one side by cells 164 to 166, and on the other side by cells 167 to 169. Communication between cells 163 to 166 is by hydraulic connection means at 171, 172 and 173 respectively. Communication between cells 163 and 167 to 169 is by hydraulic connection means at 175, 176 and 177 respectively. Communication between cells 185, 186, 187 and 188 is by hydraulic connection means at 196, 197, and 198 respectively. Communication between cells 189, 190, 191, and 192 is by hydraulic connection means at 210, 211 and 212 respectively. Recycle of biological solids is effected by continuous recycle flow from cells 166 and 169 to cell 163 by 179 and 180 respectively. Cells 163 to 169 define a central row of cells bordered by a pair of rows of aerobic treatment cells generally indicated at 182 and 183. The row 182 for the embodiment of FIG. 8 includes cells 185, 186, 187, and 188 and the row 183 includes cells 189, 190, 191, and 192. Each of the cells 185 to 192 contains at least one aerator 193.

In the first step of operation, untreated wastewater is introduced into the anaerobic cells 163 and 164 then flows through anoxic cells 165 and 166. The wastewater then flows into cell 185 at 195 but not into cell 188 because of a closed valve at 217. The wastewater then enters the subsequent cells 186, 187, and 188. After clarification in cell 188, the treated wastewater is discharged through outlet weir 199 located at the outside corner of the system, and to an outlet control valve at 200 and thence to outlet pipe 201 communicating with the effluent discharge pipe 202. During this first step, the central anaerobic cell 163 continues to receive recycled anoxic cell contents by recycles 179 and 180 as it does for all steps. The rate of recycle of this essentially nitrate free liquid is variable, depending on wastewater characteristics and treatment requirements, but typically would be in the range of 0.5 to 1.5 times the rate of flow of untreated wastewater entering the anaerobic cell 163 through the inlet pipe 160.

Also during the first step of operation, the hydraulic connection means 175, 176, and 177 allows sufficient flow to make up the continuing recycle by 180 back to anaerobic cell 163. The flow control valve at 204 located at the discharge end of cell 192 is closed so no flow passes through the open valve at 209 except to make up recycle from cells 190 and 191 to cells 165 and 168 at 205. Throughout the first step of operation, partially treated nitrified wastewater is recycled from the aerobic cell 187 to the first anoxic cell 165 at 205 for denitrification and additional recycle can be provided to cell 168 from cell 186 or 187 (not shown). The total recycle flow rate from all aerobic cells to the anoxic cells 165 and 168 is one to four times the untreated wastewater flow rate through inlet pipe 160.

At the completion of cell 188 clarification operation for this first step, the valve at 200 is closed, and the aerators in clarifier cell 188 are turned on and operated continuously until thirty to forty minutes before once again discharge of treated wastewater is required in the next cycle of operation to permit pre-settling of biological solids. Similar operations are used for each of the clarification cells for each subsequent step. Of course, valves at 214 and 215 are closed during both the first and second operational steps.

At the start of the second step, valve 195 is closed, and the valve at 204 is opened so that treated wastewater can begin to flow from cell 192 through the outlet weir 206. The valve 217 can also be opened to permit continuing recycle by 205 from cells 186 and 187 to the first anoxic cells 165 and 168. Recycle to these same cells can also be by 205 from cells 190 and 191 as shown in FIG. 8. For the second step, the direction of wastewater flow from the anaerobic cell 163 is reversed, flowing through the cells 167, 168 and 169. The wastewater then enters the cell 189 at 209, cell 190 at 210, cell 191 at 211 and cell 192 at 212 for discharge of treated wastewater through 206 and 204 to 208 and 202.

For the third and fourth steps, the wastewater flow direction through the cell rows 182 and 183 reverses to the directions shown on FIG. 8 at 196, 197, 198, 210, 211 and 212. For the third step, the outlet weir 211 is used and a control valve at 215 is open in cell 185; and for the fourth step the outlet weir 213 and control valve at 214 are open for cell 189. Control valves at 216 and 217 in cells 166 and 169 are open to the cells 192 and 188 respectively during the third step, but control valves 204 and 209 are closed for the third step. For the fourth step control valves 215 and 217 are closed and control valves 195 and 216 are opened. These valve positions permit recycle of nitrified wastewater back to cell 165 for denitrification, as well as providing for the balanced flow pathway and treatment patterns for each cell.

In addition to the recycles at 205, additional recycles can be used to improve treatment efficiency by use of recycles 221, 222, 223 and 224 from the previous step fed cells 192, 185, 189 and 188 respectively during operation steps one, two, three and four respectively. These selected recycles can also be used to enhance aerator utilization and loadings, nitrification, denitrification and phosphorous removal, as well as biological solids balance for the entire treatment system by use of selected timing and flow controls throughout the total treatment cycle.

In contrast to FIG. 7, the embodiment of FIG. 8 only requires 4 feeding steps in a fixed rotating pattern of feeding to cells 185, 189, 188 and 192 with a reversed middle two cells sequence for the second and third steps. The flexibility of the invention also permits FIG. 8 to operate with only two feed steps by selective use of recycles 221, 222 223, and 224 at the end of each clarification step to remove accumulated solids and nitrified wastewater. For this option two weirs (either 211 and 206, or 199 and 213) can be eliminated to simplify the operation of the invention.

It will be appreciated that for each of the systems illustrated in FIGS. 7 and 8, as for other embodiments, said Flow Control Weir and said central flow control means can be used to further simplify the operation and control of the systems. Also, for FIGS. 7 and 8 embodiments, depending on the wastewater characteristics, temperature and strength, higher phosphor removal can be effected by adding easily degraded organic compounds such as volatile fatty acids to the wastewater at 123 and 161 respectively. Alternatively, other carbon sources such as methanol can be used.

For all embodiments of the invention, the necessary wasting of excess activated sludge can be accomplished by pumping from an intermediate aerobic cell at a continuous rate as required to achieve the desired sludge age. Alternatively, if pre-thickened sludge wasting is desired, intermittent pumping of the bottom of any clarifier cell can be effected during its clarifier step utilizing conventional sludge collection systems.

The result of the hydraulic connection means between the cells of the systems described above is a dynamic biological solids inventory and wastewater flow pattern that rotate around and through each system, but the concentrations of solids and wastewater patterns can be predicted in advance using conventional mass balance and flow simulation methods. Using these methods in combination with conventional process kinetic models makes possible solids management and accurate design predictions of treatment efficiency for any pre-characterized wastewaters treatable with conventional activated sludge processes.

The net result of the present invention is a process treatment system with a medium depth of at least 10–30 feet which can productively utilize essentially all of the available land area, maintain the process treatment benefits of both the SBR and the conventional activated sludge processes, and finally reduce the capital cost of treatment systems by eliminating separate dedicated clarification systems.

Although the invention has been described as being intended for biological wastewater treatment systems, it will be appreciated that the invention could be used for other applications such as chemical flocculation and settling or anaerobic removal of contaminants e.g. the anaerobic contact process as well as other biological, chemical, or other processes requiring reaction or contact time with mixing or aeration followed by gravity clarification of solids prior to recycle of solids for completion of the process cycle.

We claim:

1. A method of biologically treating wastewater in a system including a basin with partition means therein subdividing the basin into at least four cells arranged as a pair of contiguous cells with discrete aeration means in each cell, the method comprising the steps of: introducing the wastewater into a first said cell; discharging the wastewater from said first cell into at least two contiguous second cells, and through said at least two contiguous second cells; subjecting the wastewater in at least three cells (said first cell and second cells) to aerobic treatment by use of said aeration means; feeding the aerobically treated wastewater to the remaining (last) cell which after presettling operates as a clarifier to settle active biological solids while said aeration means is "off"; discharging the thus treated wastewater from the system; and cyclically changing the flow of wastewater through the system, whereby one said second cell on each subsequent step becomes the first cell and the other said second cell becomes the settling cell until each cell has performed each function in the sequential pattern of feed, second position, settle, second position for a total of four steps for the at least four cells.

2. A method according to claim 1, further comprising: providing the system with two parallel, contiguous rows of at least three cells each; introducing wastewater into a first said cell; discharging the wastewater into the two second cells contiguous to said first cell and thence to at least two third contiguous cells; subjecting the wastewater in said first, second and third cells to aerobic treatment; discharging the wastewater from said third cells into said remaining last cell; permitting the wastewater to settle in the remaining (last) cell; providing all said cells with a sequential pattern of treatment steps of feed, second position, third position settle, third position, and second position.

3. A method of biologically treating wastewater comprising:
providing a system including a basin subdivided into at least four cells arranged as a pair of contiguous cells;
providing an aerator in each cell;
introducing a wastewater into a first said cell;
discharging the wastewater from said first cell into two contiguous second cells, and through said at least two contiguous second cells;
subjecting the wastewater in at least three cells (said first cell and second cells) to aerobic treatment by use of the respective aerator;
feeding the aerobically treated wastewater to the remaining (last) cell which after presettling operates as a clarifier to settle active biological solids while said aerator is "off";
discharging the thus treated wastewater from the system; and
cyclically changing the flow of wastewater through the system, whereby one said second cell on each subsequent step becomes the first cell and the other said second cell becomes the settling cell until each cell has performed the function in the sequential pattern of feed, second position, settle, second position for a total of at least four steps for the at least four cells.

4. A method according to claim 3, further comprising:
providing the system with two parallel, contiguous rows of at least three cells each;
introducing wastewater into a first said cell;
discharging the wastewater into the two second cells contiguous to said first cell and thence to at least two third contiguous cells;
subjecting the wastewater in said first, second and third cells to aerobic treatment;
discharging the wastewater from said third cells into said remaining last cell;
permitting the wastewater to settle in the remaining (last) cell;
providing all said cells with a sequential pattern of treatment steps of feed, second position, third position settle, third position, and second position.

5. A system for biological treatment of wastewater comprising: basin means; partition means subdividing said basin means into a plurality of at least four cells which are contiguous with at least two of the said cells and are connected by hydraulic connection means through said partition means; inlet means for introducing untreated wastewater selectively into each of said plurality of cells from a source thereof; discrete aerator means in each said plurality of cells for selectively aerating and then settling the contents of any said cell; outlet means in each said cell for discharging treated wastewater from the system; flow and aeration on/off schedule central control means for said system capable of directing said untreated wastewater sequentially into a first said contiguous cell, means for controlling said aeration means on for both the feed cell and said at least two contiguous cells as the wastewater flows through the feed cell and at least said two contiguous cells in opposite directions and for providing biological treatment in at least three cells prior to flowing through said hydraulic connection means to the last clarifier cell with the aeration means off for presettling and settling of biological solids prior to discharge of said treated wastewater through said outlet means; and sequential rotation means for said inlet and outlet means so that all cells function in the same four step operation pattern of feed, second position, settle, second position for each cycle of operation for said at least four cell basin means.

6. A system according to claim 5, including a plurality of contiguous cells arranged in two parallel contiguous rows of at least three contiguous cells in each row;

and said central control means including means capable of providing the same pattern for at least six steps for each cell for each cycle of operation; and an imperforate partition means disposed between selected central opposite outside cells.

7. A system according to claim 5, including flow controlled hydraulic connection means for each said partition means capable of preventing flow and allowing in unhindered flow when required between outside contiguous cells; said central control means includes means for directing the wastewater to flow through said system in clockwise and counter clockwise alternate directions, and also for controlling said aeration means on/off schedule, and also for controlling said inlet and outlet means so as to achieve four treatment steps for each of said at least four cells for each cell's cycle in a first pattern of operation of feed, second position, third position, settle, and in a second pattern of operation of feed, batch react, settle, second position, and in a third pattern of operation of feed, second position, settle, and refresh.

8. A system according to claim 5, including a plurality of contiguous cells arranged in two parallel contiguous rows of at least three contiguous cells in each row; and an imperforate partition means disposed between selected central opposite outside cells.

9. A system according to claim 5 wherein said partition means is provided between two adjacent cells and excludes said hydraulic connection means; said outlet means is provided only for said two adjacent cells; and said central control means includes means for directing the flow through said system in alternating directions in a first pattern of operation for said two adjacent cells of feed, batch react, settle, and settle, and in a second pattern of operation for the two remaining intermediate cells of second position, feed, third position, and second position.

10. A system according to claim 9, including a plurality of contiguous cells arranged in two parallel contiguous rows of at least three contiguous cells in each row; and selected imperforate partition means disposed between selected central opposite outside cells.

11. A system according to claim 7, further including means for biological treatment of wastewaters by biological nutrient removal, wherein each said outside contiguous cell is also provided with discrete mixing means which can operate independently of said aeration means to obtain biological treatment without adding oxygen by said aeration means; and said central control means includes means for directing the wastewater through said system of cells operating in sequence for anaerobic and anoxic conditions by use of mixing means for biological treatment without said means being on; aerobic biological treatment means provided in at least one said first cell and subsequently in at least two said second cells with aeration means "on" to provide oxygen addition in said second cells prior to settling of biological solids in said last cell and discharge for each cell of feed anaerobic/anoxic, first position aerobic, second position aerobic, settle, for at least four steps.

12. A system according to claim 11, including at least one discrete anaerobic pretreatment cell provided with mixing means, but no aeration means, in communication with each first cell of said anoxic cell(s) by outlet means from said anaerobic cell and by recycle means back to said anaerobic cell(s) from said (last) anoxic cell; and said central control means includes means for directing the schedule and flow rate of the said anaerobic cell(s) communication with said anoxic cell(s) to coincide with each step and operation and to provide a pattern of operation for each cycle for each outside cell of:

feed of anaerobic pretreated wastewater from anaerobic cell combined with contents of previously settled solids in clarifier cell settle step with nitrified wastewater, and mixing by mixing means in cell to achieve anoxic biological denitrification and recycle means back to anaerobic cell, then to the first aerobic treatment position cell, from there to the second aerobic treatment position cell with recycle back to first anoxic cell located in said outside contiguous cells or outside concentric cell, and to settling and discharge of treated effluent.

13. A system according to claim 11, for biological treatment of wastewaters including biological nutrient removal wherein said two adjacent cells are also provided with discrete mixing means which can operate independently of said aeration means; and said central control means includes means for directing the wastewater through said system of cells to obtain mixing for biological treatment without aeration and oxygen addition means and subsequent treatment with aeration means "on" prior to settling of biological solids and discharge of treated wastewater from said outlet in either said adjacent cells.

14. A system according to claim 10, for biological nutrient removal wherein said two parallel contiguous first rows of cells are located on the outside of a third row of contiguous cell(s) connected by hydraulic connection means; said third row of cell(s) containing a discrete mixing means in at least one cell to provide biological treatment without oxygen addition from an aeration means; biological solids recycle means is provided from said first two rows of cells to the at least one central cell in said third row of cell(s) with only mixing means provided for said central cell; untreated wastewater introduced only to said central cell through an inlet means; said central control means is provided to also be capable of directing partially treated wastewater through both said two parallel first rows of cells in alternating directions for aerobic biological treatment prior to discharge of treated effluent from four of said cells located at the outside corners of said system; said outside corner cells also provided with inlet flow controlled hydraulic connection means on the partition with the adjacent cell in said third row of contiguous cells.

15. A system according to claim 14 for biological nutrient removal wherein said third row of contiguous cells also contains at least two additional cells, one or more on each side of said central cell; said central cell inlet means receives all untreated wastewater, and continuous recycle is received by said central cell from at least two adjacent said third row contiguous cells by recycle means, mixing by mixing means, but no aeration means is provided and no recycle means is provided to said central cell, from said adjacent two parallel first row of cells; the said central cell can be subdivided optimally into three or more cells sized to function anaerobically with only mixing; the said adjacent third row contiguous cells sized to function anaerobically with only mixing; the said adjacent third row contiguous cells are also subdivided optimally into four or more cells, each sized to function an an anoxic cell mode with high recycle rates by aerobic recycle means from the adjacent two parallel first rows of cells and said anoxic cells recycle back to said central cell by anoxic recycle means; and the outermost cells in said third row of continuous cells are supplied with mixing means in addition to alternative aeration means, as well as flow controlled hydraulic connection means to both adjacent said outside corner cells in said two parallel contiguous rows of cells.

16. A system for biological treatment of wastewater comprising:
- a basin, said basin being divided into a plurality of at least four cells which are contiguous with at least two of the said cells and are hydraulically connected;
- an inlet for introducing a wastewater into each of said at least four cells;
- an aerator disposed in each said plurality of cells for selectively aerating and then settling the contents of any said cell;
- an outlet provided in each said cell for discharging treated wastewater from the system;
- a flow and aeration on/off schedule central control for said system capable of directing said untreated wastewater sequentially into a first said contiguous cell;
- an aerator control for controlling each said aerator on and off;
- a sequential rotation control for said inlet and outlet means so that all cells function in the same four step operation pattern of feed, second position, settle, second position for each cycle of operation for said at least four cell basin means; and
- whereby, said aerator control controls each said aerator on for both the feed cell and said at least two contiguous cells as the wastewater flows through the feed cell and through at least said two contiguous cells in opposite directions and provides biological treatment in at least three cells prior to the wastewater flowing through to the last clarifier cell with the aerator off for presettling and settling of biological solids prior to discharge of said treated wastewater through said outlet.

17. A system according to claim 16, including: a plurality of contiguous cells arranged in two parallel contiguous rows of at least three contiguous cells in each row; and said central control includes a pattern control capable of providing the same pattern for at least six steps for each cell for each cycle of operation; and an imperforate partition is disposed between selected central opposite outside cells.

18. A system according to claim 16, including a flow controlled hydraulic connection for each said partition capable of preventing flow and allowing in unhindered flow when required between outside contiguous cells; said central control includes a flow direction control directing the wastewater to flow through said system in clockwise and counterclockwise alternate directions, for controlling the aeration on/off schedule, and for controlling said inlet and outlet for achieving four treatment steps for each of said at least four cells for each cell's cycle in a first pattern of operation of feed, second position, third position, settle, and in a second pattern of operation of feed, batch react, settle, second position, and in a third pattern of operation of feed, second position, settle, and refresh.

19. A system according to claim 16, including a plurality of contiguous cells arranged in two parallel contiguous rows of at least three contiguous cells in each row; and an imperforate partition disposed between selected central opposite outside cells.

* * * * *